United States Patent [19]

Ozaki

[11] Patent Number: 4,693,567
[45] Date of Patent: Sep. 15, 1987

[54] APPARATUS FOR PROJECTING LUMINOUS LINES ON AN OBJECT BY A LASER BEAM

[76] Inventor: Yasuto Ozaki, 22-2, Horen-cho, Nara, Japan

[21] Appl. No.: 524,036

[22] Filed: Aug. 17, 1983

[30] Foreign Application Priority Data

Aug. 21, 1982 [JP] Japan ................................. 57-144912
Apr. 22, 1983 [JP] Japan ................................. 58-71746
Apr. 22, 1983 [JP] Japan ................................. 58-71747

[51] Int. Cl.⁴ .............................................. G02B 3/04
[52] U.S. Cl. ..................................... 350/433; 350/443
[58] Field of Search ........................ 350/443, 433, 171

[56] References Cited

U.S. PATENT DOCUMENTS 4,184,748 1/1980 Kugler et al. ....................... 350/433
4,475,793 10/1984 Ford ................................... 350/171

Primary Examiner—John K. Corbin
Assistant Examiner—P. M. Dzierzynski
Attorney, Agent, or Firm—Wenderoth, Lind & Ponack

[57] ABSTRACT

An apparatus projects luminous lines on an object by a laser beam and includes a laser beam generator wherein the laser beam has a width, a convex lens for limiting the width of the laser beam, and a reflector located at a position subsequent to the convex lens, wherein the reflector has a cylindrical reflecting surface adapted to allow the reflecting luminous lines to reflect unidirectionally at gradually decreasing angles with respect to the reflector. Thus, the laser beam is reflected at different points on the reflecting surface, at different angles, thereby forming sector-shaped continuous luminous lines on an object to be marked.

2 Claims, 8 Drawing Figures

APPARATUS FOR PROJECTING LUMINOUS LINES ON AN OBJECT BY A LASER BEAM

BACKGROUND OF THE INVENTION

1. Field of the Invention

The present invention relates to an apparatus for projecting luminous lines from a laser beam source. More particularly, the present invention relates to an apparatus for projecting lines of light by diverging a laser beam at wide angles, wherein the laser beam is emitted from a single source.

2. Description of the Prior Art

It has been the common practice to employ a polygonal mirror rotated at a high speed, on which a laser beam is cast so as to reflect the beam in desired directions. However, this arrangement calls for a complicated device whereby the mirror is rotated at a high speed. In addition, such arrangement is not applicable when information must be transmitted at a high speed to electronic appliances, because the divergence of the laser beams is only derived from the moving reflection points on the mirror. There is another device known in the art, in which a cylindrical lens is employed to enable the laser beam to refract therethrough at a small angle. However, the application of this device is limited because of the incapability of obtaining a refraction at wide angles.

OBJECTS AND SUMMARY OF THE INVENTION

An object of the present invention is to provide an apparatus capable of constantly casting a divergent luminous flux at relatively wide angles with the use of a single source of laser beams, thereby obtaining clearly distinct lines of light on an object.

Another object of the present invention is to provide an apparatus capable of constantly projecting a plurality of lines of light at predetermined angles.

Other objects and advantages of the present invention will become apparent from the detailed description given hereinafter. It should be understood, however, that the detailed description and specific embodiments described are given by way of illustration only, since various changes and modifications within the spirit and scope of the invention will become apparent to those skilled in the art from this detailed description.

The present invention has several applications, among which is the marking-off on large objects, such as buildings, bridges, ships, where a large span of marking is required. Another application is laser radiation, in which the laser beams are radiated into the atmosphere without having any object to be cast on. When the apparatus is designed to be small-sized, it can be used for a laser printer, a facsimile machine, and a copying machine. Recently, the invention finds application in optical communication, in which the apparatus is used to branch a single transmission line into many lines. For more commercial uses, the invention is used for processing materials, on displays for advertisements, or for ornamental purposes.

SUMMARY OF THE INVENTION

According to the present invention, there is provided an apparatus which includes a generator for producing a laser beam having a desired width, a convex lens for providing the beam to be sufficiently narrow as not to exceed a desired width, and a reflector located at a position subsequent to the convex lens, wherein the reflector has a cylindrical reflecting surface adapted to allow the reflecting luminous lines to reflect unidirectionally at gradually decreasing angles with respect to the reflector, whereby the laser beam is reflected at different points on the reflecting surface at different angles, thereby reflecting sector-shaped continuous luminous lines onto an object to be marked.

According to another aspect of the present invention, there is provided an apparatus which includes a generator for producing a laser beam having a desired width, a concave lens for diverging the laser beam, a convex lens located at a position subsequent to the concave lens, a cylindrical reflecting surface located at a position subsequent to the convex lens, at least two reflectors located between the laser beam generator and the concave lens, wherein the reflectors intersect each other at right angles, and one of the reflectors includes means for adjusting the laser beam in the X-direction while the other reflector includes means for adjusting the laser beam in the Y-direction.

DETAILED DESCRIPTION OF THE PREFERRED EMBODIMENT

Figure 1:
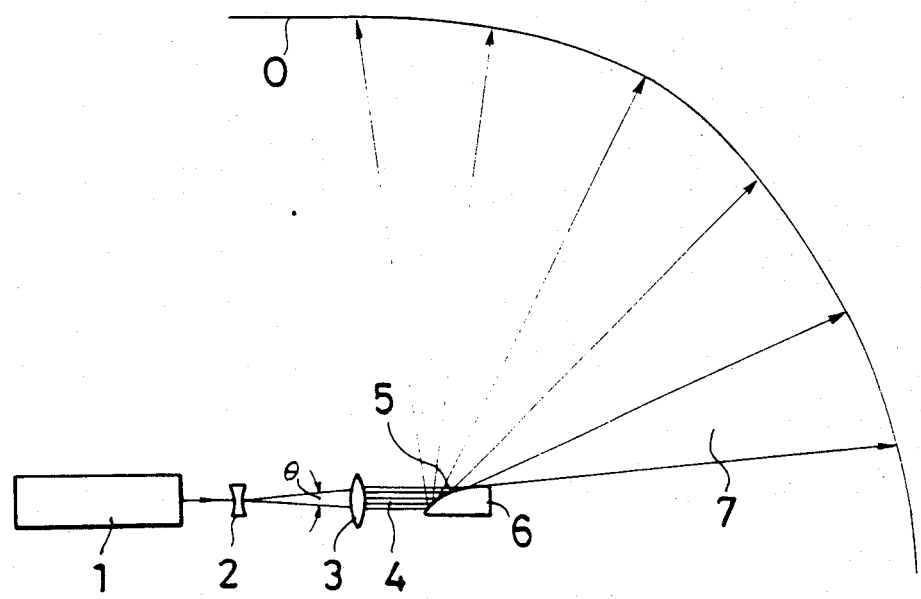
FIG. 1 is a schematic view exemplifying the structure and operation of the present invention.

Referring to FIG. 1, a He-Ne laser tube 1 produces a red visible ray. A concave lens 2 diverges the laser radiation at an angle $\theta$, and a convex lens 3 condenses the divergent beam radiation toward a reflector 6. The obtained laser beam is designated by the reference numeral 4, and has a diameter of a few millimeters or several tens of millimeters. The reflector 6 has a spherical reflecting surface 5, which has reflecting angles continuously changing in one direction alone, that is, in FIG. 1, in the direction parallel with a paper. The spherical surface 5 can be shaped in a cylindrical form or in a non-cylindrical form. The position of concave lens 2 is adjustable forwardly or backwardly, thereby adjusting the point of focus. The reflector 6 is mounted on a base (not shown) with the use of a fastener, such as bolts, and the angle of attachment can be adjusted.

Figure 2:
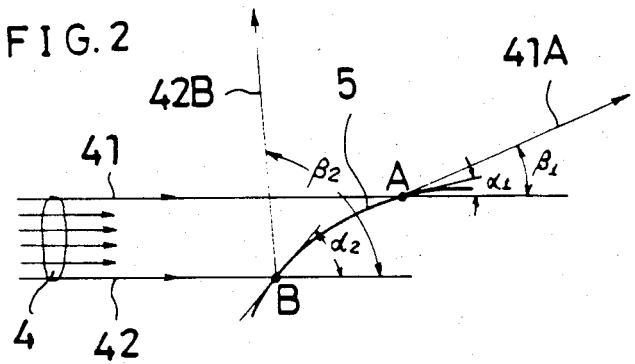
FIG. 2 is a schematic view exemplifying the operation in greater detail.

Suppose now that the laser beam 4 has outermost lines of light 41 and 42, hereinafter the former being referred to as the top line and the latter as the bottom line, as shown in FIG. 2. The top line 41 impinges on surface 5 at point (A), at an angle $\alpha_1$, and reflects at angle $\beta_1$, i.e. $2\alpha_1$, to become a light beam 41a. The bottom line 42 impinges at point (B), at an angle $\alpha_2$, and reflects at angle $\beta_2$, i.e. $2\alpha_2$, to become a light beam 42B. In this way the laser beam 4 is widely diverged in the range of $\beta_1$ to $\beta_2$, and changes into a sector-shaped luminous flux 7 for reflection onto a large curved object O shown in FIG. 1. When the reflecting surface 5 is made non-spherical, it is possible to control the distribution of reflecting lights by designing the surface in various contours.

Figure 3:
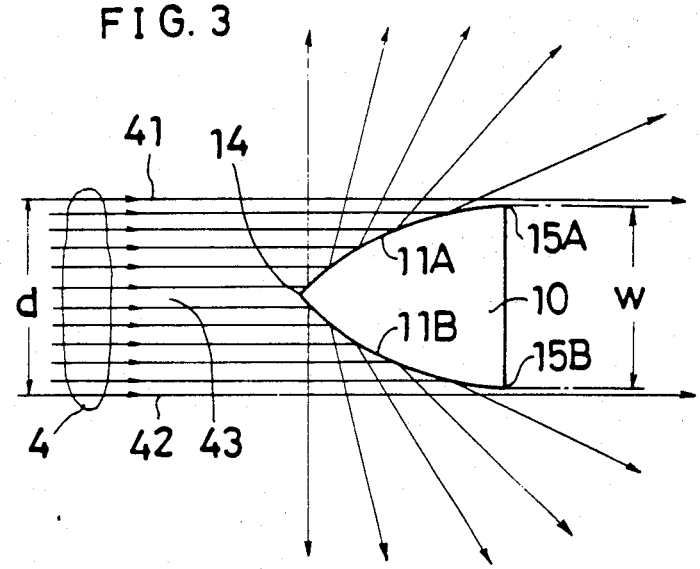
FIG. 3 is a plan view showing one embodiment of the present invention.
Figure 4:
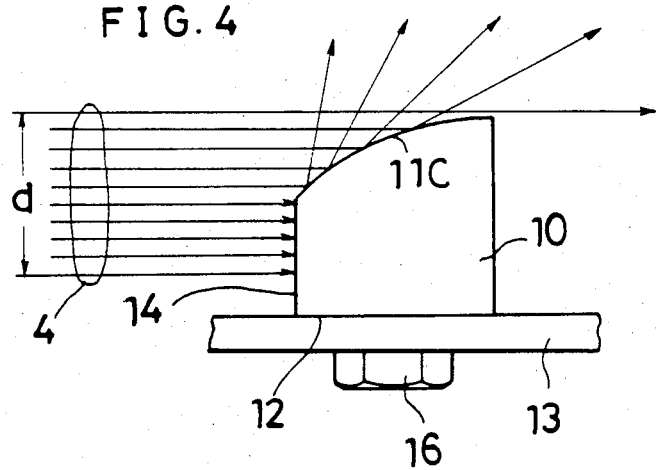
FIG. 4 is a side view of the apparatus of FIG. 3.

Referring to FIGS. 3 and 4, a reflector 10 is defined by side curved surfaces 11A and 11B, a top curved surface 11C, an edge 14 and a bottom 12, which is fastened to a base plate 13 by means of a bolt 16. As shown in FIGS. 3 and 4, each curved surface 11A, 11B and 11C consists of reflecting points arranged so as to enable the light to reflect at different angles in one direction, wherein the lines of reflection on the top curved surface 11C are in planes perpendicular to those including the lines of reflection on the side curved surfaces 11A, 11B. The side curved surfaces 11A and 11B are spaced by a distance (W) at their terminating ends, wherein the distance (W) is made equal to or slightly smaller than, the diameter (d) of the laser beam 4. At each terminating end 15A, 15B of the side curved surfaces 11A and 11B, the angle of reflection $\beta$ is zero.

Figure 5:
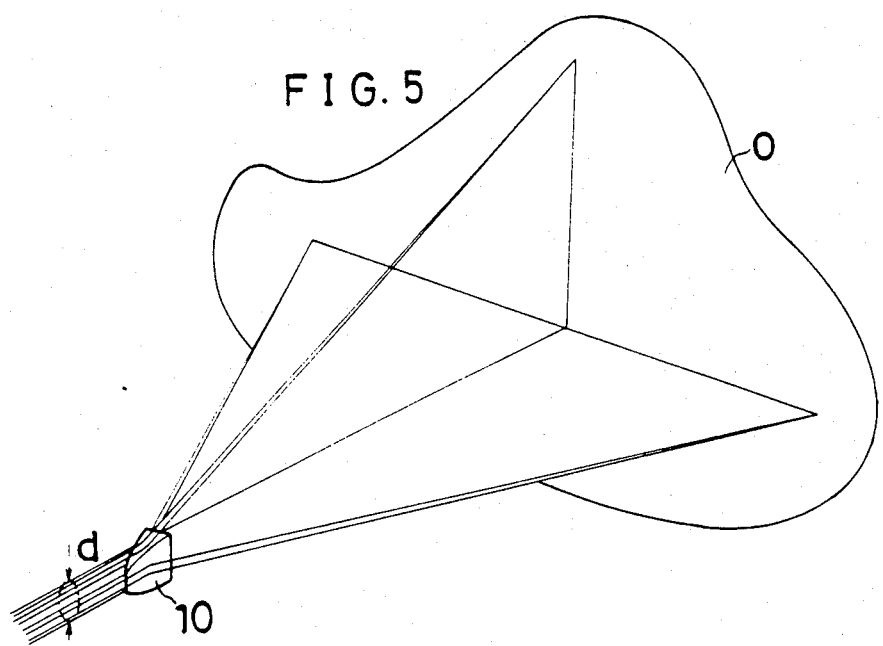
FIG. 5 is a schematic view exemplifying the condition of the luminous lines obtained by the embodiment of FIGS. 3 and 4 on a large object.

In the embodiment illustrated in FIGS. 3 and 4 the outermost lines 41 and 42 in the laser beam 4 are free from reflection on the reflector 10 and pass straight over the reflector 10 onto the object O shown in FIGS. 1 and 5. In contrast, an innermost line 43 is reflected around the edge 14 at the largest angle. As shown in FIG. 3, when viewed toward the edge 14, the light reflection on the side curved surfaces 11A and 11B is a single continuous luminous line, which diverges from the edge 14 in right-hand and left-hand directions. The reflection on the top curved surface 11C is a luminous line perpendicular to those expanding from the side curved surfaces 11A and 11B. By maintaining both side curved surfaces 11A and 11B perpendicular to the base as shown in FIG. 5, the luminous reflections thereon and those on the top curved surface 11C are maintained perfectly horizontal and vertical, respectively.

When the line of reflection is to be focused on a vast area of an object in a single thin line, it may be doubted if the apparatus of the present invention is capable of achieving such result, because of the difference in the distances to the object from the straight lines of reflection and from the reflections expanding in the right-hand and the left-hand directions. However, the spherical aberration of the convex lens 3 is effective to enable these reflections to be focused in a single linear form. More concretely, referring to FIG. 3, the lines of light having small angles with respect to the reflector 10 come from the peripheral portion of the laser beam 4, whereas the lines of light forming a large angle around the edge 14 come from the zone extending from the central part of the laser beam toward its peripheral portion, such that the light from the central part of the light beam is stronger than that from its peripheral portion. By virtue of this fact, the above possible difficulty is avoided.

To demonstrate the effects of the apparatus, mathematical results by means of simulation obtained by a computer are shown in a Table given below.

Figure 8:
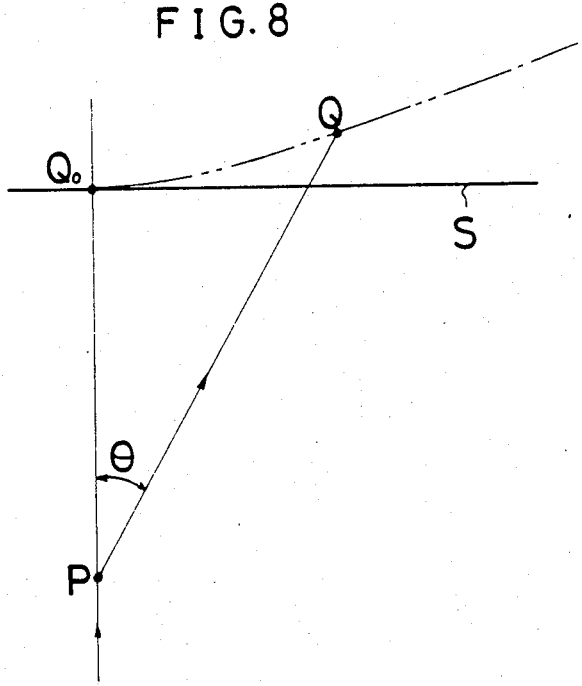
FIG. 8 is a diagrammatic view exemplifying the simulation obtained by the present invention.

Referring to FIG. 8, an angle $\theta$ (rad.) indicates a reflecting angle with respect to the optical axis, F(mm) indicating a distance from the point (P) of the convex lens to the point of focus Q, and B(mm) indicating a width of the luminous lines at the point of focus Q. BT(mm) indicates a width of the luminous lines on an area S of the object, onto which area of the object the laser beam strikes the point of focus $Q_o$ on the optical axis, and is additionally perpendicular thereto. The optical conditions provided for the simulation are as follows:

| | |
|---|---|
| Refractive indexes for the concave lens and the convex lens | N = 1.5093 |
| The distance D from the concave lens to the convex lens | D = 134 mm |
| The distance MD from the convex lens to the reflector | MD = 40 mm |
| The radius MR of the reflecting curved surface of the reflector | MR = 50 mm |
| The spherical radius $R_1$ of each side of the concave lens | $R_1$ = 10 mm |
| The thickness $M_1$ of the concave lens (an integer structure) | $M_1$ = 0.5 mm |
| The spherical radius $R_2$ of each side of the convex lens | $R_2$ = 145 mm |
| The thickness $M_2$ of the convex lens (an integer structure) | $M_2$ = 2 mm |

It will be noted from the Table that the values for F increase in accordance with the increase in the angle $\theta$, and that the values for BT remain unchanged regardless of the increase in the angle $\theta$, keeping substantially the same value. This means than the luminous line is uniformly thin, represented in a single sharp line.

TABLE

| $\theta$ (rad.) | F (mm) | B (mm) | BT (mm) |
|---|---|---|---|
| 0.00 | 22044.217 | 0.36861 | 0.36861 |
| 0.05 | 22100.054 | 0.36522 | 0.37436 |
| 0.10 | 22267.693 | 0.35506 | 0.39107 |
| 0.15 | 22544.38 | 0.33863 | 0.41729 |
| 0.20 | 22939.034 | 0.31593 | 0.45037 |
| 0.25 | 23448.944 | 0.28778 | 0.48823 |
| 0.30 | 24071.034 | 0.25523 | 0.52466 |
| 0.35 | 24807.487 | 0.21917 | 0.55749 |
| 0.40 | 25649.989 | 0.18107 | 0.58024 |
| 0.45 | 26592.007 | 0.1424 | 0.5875 |
| 0.50 | 27611.293 | 0.10512 | 0.58488 |
| 0.55 | 28681.285 | 0.07113 | 0.5571 |
| 0.60 | 29749.965 | 0.04263 | 0.49704 |
| 0.65 | 30756.166 | 0.02108 | 0.42398 |
| 0.70 | 31613.618 | 0.00723 | 0.34878 |
| 0.75 | 32208.416 | 0.00049 | 0.29277 |
| 0.80 | 32487.07 | 0 | 0.03138 |

Figure 6:
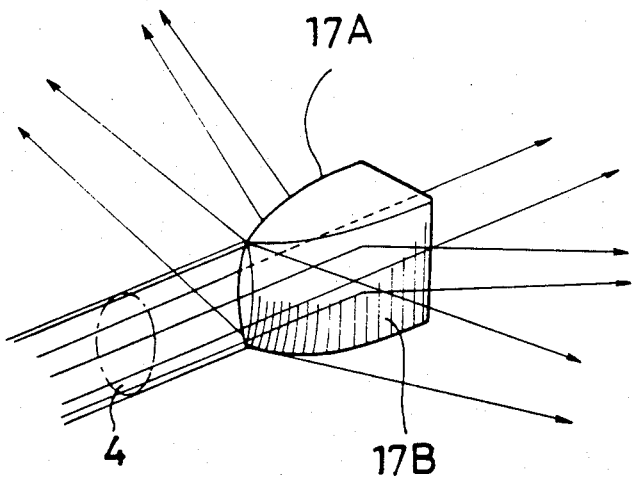
FIG. 6 is a perspective view showing another embodiment of the invention.

FIG. 6 shows an alternative embodiment in which the side curved surfaces 17A, 17B are maintained convex, not perpendicular, wherein the degree of convexity becomes large in accordance with the increase in the angles of reflection. This ensures that the reflected luminous lines are focused on every point on the object O facing the reflector 10 in FIG. 5.

Figure 7:
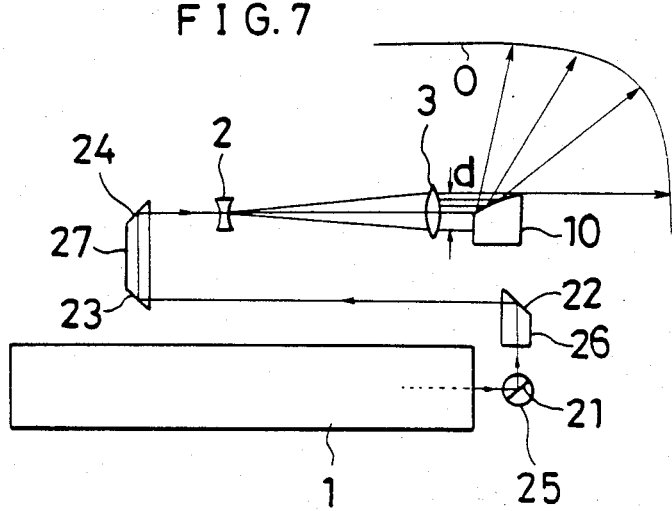
FIG. 7 is a schematic view exemplifying the structure of a further embodiment of the invention.

FIG. 7 shows another embodiment, in which a unique arrangement is provided for guiding a laser beam. The unique arrangement consists of a laser guiding path from a laser oscillator 1 up to concave lens 2. The laser output from the oscillator 1 is reflected on a Y-axis adjusting mirror 21 and an X-axis adjusting mirror 22, and is again reflected by a second mirror unit which consists of two mirror components 23 and 24 crossing each other at a right angle. In this way the laser is led to concave lens 2 and convex lens 3. The Y-axis adjusting mirror 21 is secured to a pillar 25 capable of rotating around an axis crossing the paper at a right angle, and the X-axis adjusting mirror 22 is secured to another pillar 26 capable of rotating around an axis crossing the pillar 25 at a right angle. The mirror components 23 and 24 are fixed to each other such that they cross each other at a right angle, and they are secured to a pillar 27, which is axially slidable and rotatable. Under this arrangement each mirror component 23 and 24 is adjustable in a desired direction. This arrangement reduces the difficulty involved in maintaining the positional relationship between the laser oscillator 1 and the optical components in an optically precise manner. Instead, the adjustment of each mirror component can achieve the desired incidence of the laser beam on the reflector 10 and then onto the object O. In addition, as shown in FIG. 7, the laser oscillator 1 and the optical system can be compactly arranged, not in series but in parallel so as to minimize space requirements. This is one of the advantages of this embodiment.

What is claimed is:

1. An apparatus for projecting luminous lines on an object by use of a laser beam, said apparatus comprising:
   means for producing a laser beam;
   means, located at a position subsequent to said producing means, for expanding said laser beam, said expanding means comprising concave lens means for diverging said laser beam, and convex lens means, positioned subsequent to said concave lens means, for converging said laser beam to be of a maximum desired width;
   a reflector having a central plane, said reflector being located at a position subsequent to said convex lens means with the optical axis of said laser beam extending in said central plane;
   said reflector having a pair of curved side reflecting surfaces intersecting along an edge of said reflector, said edge lying in said central plane, said pair of side reflecting surfaces diverging symmetrically from opposite sides of said central plane in directions away from said convex lens means;
   said pair of side reflecting surfaces thereby forming means for reflecting said laser beam at different angles with respect to said central plane, at respective different positions along said pair of said reflecting surfaces, and thus for reflecting a pair of sector-shaped luminous lines on an object, said sector-shaped luminous lines expanding symmetrically from said side reflecting surfaces;
   said reflector having a curved top reflecting surface extending transverse to and intersecting said pair of side reflecting surfaces and extending perpendicular to said central plane, said central plane symmetrically bisecting said top reflecting surface; and
   said top reflecting surface thereby forming means for reflecting said laser beam at different angles at respective different portions along said top reflecting surface, and thus for reflecting further sector-shaped luminous lines on the object, said further luminous lines expanding symmetrically from said top reflecting surface in directions perpendicular to said pair of sector-shaped luminous lines.

2. An apparatus as claimed in claim 1, further comprising first and second further reflectors positioned between said laser beam producing means and said concave lens means, said first and second further reflectors extending at a right angle with respect to each other, means at said first further reflector for adjusting said laser beam in the X-direction, and means at said second further reflector for adjusting said laser beam in the Y-direction.

* * * * *